United States Patent [19]
Curtin

[11] Patent Number: 4,876,711
[45] Date of Patent: Oct. 24, 1989

[54] SERIES CONNECTED TELEPHONE SERVICE SYSTEM

[76] Inventor: William J. Curtin, 4037 Tokay Blvd., Madison, Wis. 53711

[21] Appl. No.: 132,700

[22] Filed: Dec. 7, 1987

Related U.S. Application Data

[63] Continuation of Ser. No. 285,938, Jul. 23, 1981, abandoned.

[51] Int. Cl.⁴ .................... H04M 3/50; H04M 3/56; H04M 11/00
[52] U.S. Cl. ................................ 379/94; 379/203; 379/214; 379/215; 379/263
[58] Field of Search ................ 379/215, 94, 96, 202, 379/203, 212, 213, 214, 218, 262, 263

[56] References Cited

U.S. PATENT DOCUMENTS

| | | | |
|---|---|---|---|
| 4,117,270 | 9/1978 | Lesea | 379/157 |
| 4,232,199 | 11/1980 | Boatwright et al. | 379/197 |
| 4,311,875 | 1/1982 | Danner | 379/201 |

FOREIGN PATENT DOCUMENTS 2035754  6/1980  United Kingdom ............... 379/201

OTHER PUBLICATIONS

"The Metallic Facility Terminal: Special Help for Special Services", by Clark and Porter, *Bell Labs Record*, vol. 54, No. 8, Sep. 1976, pp. 215-219.

Primary Examiner—Thomas W. Brown

[57] ABSTRACT

An off-site remote telephone service system is connected in series with subscribers to the system and the associated central telephone office for providing to each of the subscribers additional telephone services. The telephone service system is connected in series between the subscribers and the main frame distribution mechanism of the central telephone office. In addition to the wires connecting the telephone service system in the series connection, the system also has at least one independent telephone line for placement of calls, which telephone line extends to the central office. All of these telephone lines are connected to a control switching mechanism of the telephone service system. The control switching mechanism includes a bridging mechanism for coupling a subscriber telephone line either to a continuation of the subscriber telephone line or to one of the independent telephone lines of the system for placement and receipt of calls for enabling normal service by the subscriber. The telephone service system further includes a special service mechanism acting as an intercept between the subscriber telephone and the central office for providing special services to the subscriber. Exemplary of such special services are access to special long distance telephone lines, telephone answering services, electronic mail services, word processing services, computer services and conference call services along with many other advanced services currently available.

19 Claims, 17 Drawing Sheets

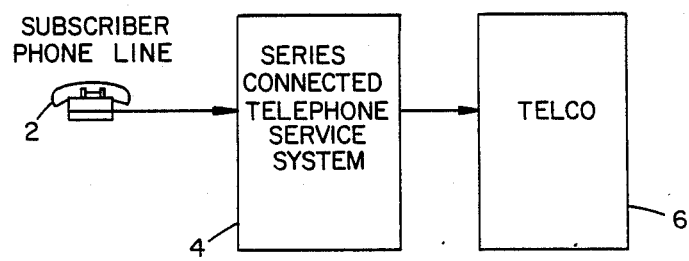
FIG. 1
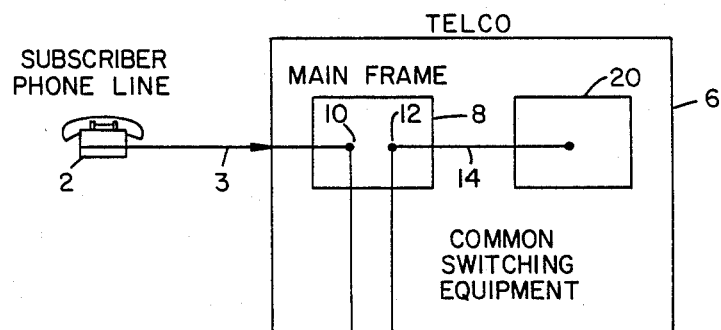
FIG. 2
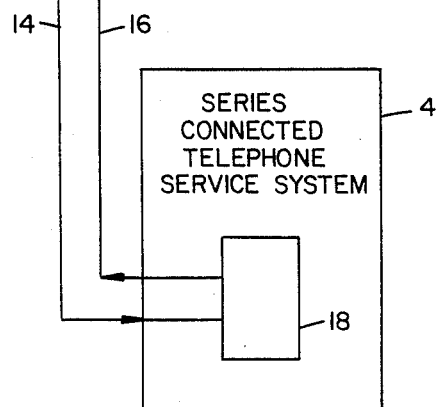

4,876,711

SERIES CONNECTED TELEPHONE SERVICE SYSTEM

This application is a continuation of application Ser. No. 285,938 filed July 23, 1981, abandoned.

BACKGROUND OF THE INVENTION

The present invention is concerned with providing a telephone service system at a location remote from both the subscribers to the system and the telephone central office.

In recent years numerous advanced services that can be provided to telephone subscribers have been developed. These advanced services have only been available, however, either directly through the telephone company (referred to herein as "TELCO") or to a limited extent by the installation of specialized complex equipment directly at the subscriber location. Due to both the high cost of directly renting such services from the telephone company and the high cost of a subscriber independently installing such specialized equipment, such services have been generally unavailable, or at least unaffordable, to most of the subscribers.

The lack of affordability of such sevices has been one reason for the development in recent years of what is referred to as a resale business in phone lines. The resellers have rented directly from the telephone company directdial long distance telephone lines, e.g. WATS lines, and then have resold access to such lines to various subscribers. In addition, some forms of limited services have been provided by telephone answering systems, e.g. the answering of calls and taking of messages, for various subscribers. The services made available by these types of systems, however, are extremely limited and do not afford the subscribers the full scope of services that exist but only can be acquired at relatively high rates directly from TELCO.

The telephone answering systems currently in existence have been coupled to the subscriber telephone lines either in a parallel connection between the subscriber lines and the telephone central office or by call forwarding of a call passing through the telephone central office. Exemplary of the various types of parallel connections that have been made of the telephone answering systems to the connection between the subscriber lines and the telephone central office are those embodiments described in the following U.S. Pat. Nos.: 2,685,614 to W. J. Curtin; 2,971,061 to R. V. Judy; 2,985,721 to E. H. Gatzert; 3,179,750 to W. M. Reilly; 3,445,603 to P. R. Robinson; 3,637,947 to C. Breen; and, 4,140,879 to S. D. Hefferman.

The patents to Curtin, Judy and Gatzert all disclose various embodiments of telephone answering systems. The patent to Reilly describes a telephone switching system having equipment at a private branch exchange (PBX) that minimizes the number of incoming calls requiring services of the local PBX operator. The patent to Robinson describes a circuit for tripping the ringing in an intercept circuit before an announcement is applied to the intercept telephone line. The patent to Breen describes a call forwarding arrangement that can be employed in telephone answering service systems. The patent to Hefferman describes a control circuit for transfer of auxiliary telephone equipment that utilizes the customers own tip and ring lines to allow the customer to selectively transfer incoming calls from a primary equipment location to an auxiliary equipment location such as an answering service.

In an attempt to modernize the older existing telephone central offices having electromechanical switching systems and not electronic switching systems (typically referred to as "ESS") so as to provide custom calling type services, certain equipment has been developed for incorporation directly in the telephone central offices. Exemplary of such equipment is the equipment offered by Summa Four, Inc. under the designation ACCESS 4075. Such equipment is a plug-in system that can be put on line directly in the telephone central office with connections to the main frame between the subscriber line appearance and the office switching equipment. This type of equipment is provided to and utilized by the telephone central offices for enhancing the types of services they are capable of providing to their various subscribers. The system enables TELCO to then provide the following services: incoming call alert signalling; call forwarding; abbreviated dialing; conferencing; DTMF dialing; instant re-call; restrictive use control; ring-back signalling; and remote programming. All of these services are typically available in the more modernized ESS TELCO offices.

Certain other limited types of series connected equipment have been made available for incorporation directly at the subscriber premises. Such equipment has been provided for enhancing certain services and is incorporated into the subscriber system by way of plug-in jacks directly into the subscriber's circuit. While attempts may have been made for the provision of remote supplemental services coupled into the telephone system by way of a series interconnection, there is no known successful system that has been provided.

Moreover, the prior art fails to provide an efficient arrangement wherein a switching structure provides special services, including receptionist services, to a plurality of subscribers and requires a smaller number of additional lines than the number of subscribers.

SUMMARY OF THE INVENTION

An object of the present invention is to provide an off-site telephone service system arranged at a location remote from both subscribers to the system and an associated central office and coupled in series with each subscriber and such central office for providing a variety of extended custom telephone services to each subscriber, wherein a number of independent telephone lines is shared by a larger number of subscribers to provide receptionist services thereto.

Another object of the present invention is to provide a series connected telephone service system capable of providing a variety of custom calling services to a plurality of subscribers that may otherwise be unavailable at an affordable cost directly from the telephone central office.

A further object of the present invention is to provide at a remote location a telephone service system connected in series between a plurality of subscribers and a telephone central office that functions as a detection, control and switching system that functions to control communications so that (1) communications originating at the subscriber telephone can go directly to the central office or not in dependence upon control of the system, (2) communications originating from the central office go to the subscriber telephone or not in accordance with functions of the system selected and (3) communications originating at the telephone service system go to either the subscriber telephone or to the central office in accordance with the control of the system.

Another object of the present inventon is to provide a remote telephone service system connected in series between a plurality of subscribers and a telephone central office for providing custom calling services to each of the subscribers including a telephone answering service for enabling the system to screen calls to a subscriber and announce such calls or take messages for the subscriber.

Yet another object of the invention is to provide a telephone service system connected in series between a plurality of subscribers and a telephone central office for providing custom calling services to each of the subscribers, including a telephone answering service for enabling the system to screen calls to a subscriber and announce such calls or take messages for the subscriber, wherein a number of telephone lines, independently assigned to the system, are allocated to, and shared by, a larger number of subscribers on an as-needed basis.

A still further object of the present invention is to provide a telephone service system connected in series between each of a plurality of subscribers and a telephone central office for enabling each such subscriber to place a call through such system by using an independent telephone line assigned to the service system and, for purposes of the current call only, allocated to the subscriber, while still leaving the subscriber's own line assigned by TELCO open for incoming calls that can then be received by the system.

Still another object of the present invention is to provide a telephone service system remote from the telephone company capable of providing a variety of telephone services including, but not limited to, the following: normal usage of the subscriber telephone; establishing of conference calls set up by the system; automatic monitoring of various sensors at the subscriber location such as power, furnace, smoke detectors, heat detectors, intrusion detectors and medical alerts with automatic signalling for appropriate emergency services where applicable; automatic utility meter readings; call diversions; answering services; call monitoring or screening; access to multiple calls through a single telephone line, PABX type service; answering of incoming calls and providing call waiting signalling; access to special long distance discount lines; automatic message taking and transmittal services; automatic dialing; data link communications; call forwarding; access to word processing equipment; access to electronic mail equipment; and access to various computer services such as electronic filing and activity management services.

Yet another object of the present invention is to provide a telephone service system, at or near a location of a number of subscribers and remote from the TELCO, the system having a number of independent telephone lines assigned thereto by TELCO, the number of independent lines being smaller than the number of subscribers, for allocation to the subscribers as needed in order to share the service system facilities among the number of subscribers and to provide to the subscribers services including, but not limited to, the following: receptionist services, wherein incoming calls are monitored or screened by an operator who communicates with the subscriber and not the caller to identify the call to the subscriber and to determine whether to connect the call to the subscriber's telephone; access to multiple calls through a single telephone line, PABX type service; answering of incoming calls and providing call waiting signalling; access to special long distance discount lines; automatic message taking and transmittal services; automatic dialing; data link communications; call forwarding; conference calling; and similar services.

These objectives are accomplished by the provision of a telephone service system in accordance with the present invention. The system is effectively connected in series between each subscriber and the telephone central office; this connection is made by a pair of telephone lines that extend out from the central office to the externally located telephone service system. (All references to telephone lines herein refer to a line that includes a pair of wires.) The first line of this pair of telephone lines extends from a first terminal in the main frame distribution mechanism to which the subscriber is connected and extends to a terminal of the control switching mechanism of the telephone service system. Another associated terminal of the control switching mechanism of the system is then connected back by the second telephone line of the pair to a second terminal in the main distribution frame which second terminal is associated with the same subscriber thereby completing the series connection. The telephone service system also has several independent telephone lines of its own, i.e. independent of the subscriber lines.

In such an arrangement, the second line of the pair may extend directly to the subscriber. The service system is thus connected to the TELCO by a plurality of telephone lines, including subscriber lines and a number of lines independently assigned to the system.

The control switching mechanism of the telephone service system includes a mechanism for coupling the subscriber telephone line coming into the system to one of the plurality of telephone lines, either the line associated with the subscriber or one of the independent lines, extending from the system to the central office for placement and receipt of calls for enabling normal telephone service. The telephone service system further includes special service mechanisms for providing special custom calling services to the subscriber by acting as an intercept between the subscriber telephone and the central office. This telephone service system can be incorporated within a telephone answering system and thus provide as one of the special services customary telephone answering services including the receipt and screening of calls along with the taking of messages for each subscriber to the system.

Concisely stated, the series connection telephone service system of the present invention is a telephone service system that allows a subscriber telephone to be connected to private telephone networks as well as the public network via a transparent series connection of the subscriber's telephone loop without disturbing regular or normal telephone service.

The system includes a control mechanism and a set of bridging relays that upon command are able to cause coupling of the subscriber telephone to a central office telephone line for placement of a call and coupling of the central office telephone line to the subscriber telephone for receipt of a call by the subscriber. The control mechanism and bridging relays also are capable of enabling the system to communicate in both directions between the central office and the subscriber telephone.

The control switching mechanism of the telephone service system can include an interface mechanism for detecting and routing telephone calls between a subscriber telephone and the central office. Calls being placed by a subscriber can be either routed to the central office over the particular telephone line designated for such subscriber or placed on any one of several additional independent telephone lines that are rented by the telephone service system. Such additional independent lines could be either other local numbers or special long distance lines, e.g. WATS lines. If the telephone service system couples the call being placed by the subscriber to one of its own independent telephone lines for local calls this leaves free the subscriber's telephone line in the central office for other incoming calls which then can be answered by a telephone answering service. The coupling of the subscriber to the WATS line enables the subscriber to place long distance calls at discounted rates without having to rent an independent WATS lines of its own. The long distance line can be a private network line, e.g. an MCI line.

The control switching mechanism further can include screening mechanisms for screening signals sent to and received from the subscriber telephone. Thus, it is possible for the subscriber once taking the telephone off-hook to send special signals, such as by pushing * or # button on a phone, or a code by a combination of numbers for signalling the telephone service system that it desires certain special services.

The special services mechanisms of the telephone service system also can include various data terminals. Such terminals can be either terminals for displaying information relating to any subscriber telephone being coupled through the system, which would be used in the case of a telephone answering system for identifying those subscribers either receiving or placing calls, or for the transmission of data to a particular subscriber or for retransmitting data being sent by a subscriber, such as, for example, in connection with an electronic mail service.

In the situation where a subscriber when placing a call has used one of the system's independent telephone lines thereby leaving free the telephone line associated with the subscriber, the subscriber's line from TELCO can be monitored. The control mechanism can include a mechanism for monitoring and enabling the answering of any incoming calls on such associated subscriber telephone line. In such situations, the control mechanism can then provide a call waiting signal to the subscriber telephone when such subscriber telephone is already engaged in another call. In addition, the special service mechanism can enable a subscriber to establish a conference call between the subscriber telephone and at least two telephone lines extending to the telephone central office. One of these telephone lines used in connection with the conference call may be the line associated with the subscriber although it is not necessary.

In utilizing the telephone service system of the present invention, it is possible to extend a full scope of electronic office services to each of the subscribers to the system. Several examples of such possible services are set forth below. A full scope of word processing services can be provided including: text creation and editing, filing and retrieval, list processing, and mailing lists being used in conjunction with high speed printers for sending a large number of personalized letters. Advanced text management functions also can be incorporated into the system including the utilization of proofreading equipment. Another area of technology now rapidly developing is the area of electronic mail services and this also can be included in the system such as with the following features: creation of notes, memos and letters; distribution acknowledgement; telexes; existing public electronic mail networks; and facsimile services. Two other potential uses include electronic filing and retrieval of filed material and in addition activity management processing such as clientele management, scheduling and maintaining files and telephone logs.

BRIEF DESCRIPTION OF THE DRAWINGS

FIG. 1 is a conceptual block diagram illustrating the connection of the series connected telephone service system of the present invention with the subscriber telephone line and the telephone company central office (TELCO).

FIG. 2 is a block diagram circuit illustrating one form of interconnection of the series connected telephone service system of the present invention between the subscriber telephone line and the common switching equipment of TELCO.

FIG. 9 shows the call being taken by the telephone answering service, FIG. 10 the telephone answering service ringing the subscriber and FIG. 11 the caller being coupled to the subscriber.

DESCRIPTION OF THE PREFERRED EMBODIMENTS

Figure 3:
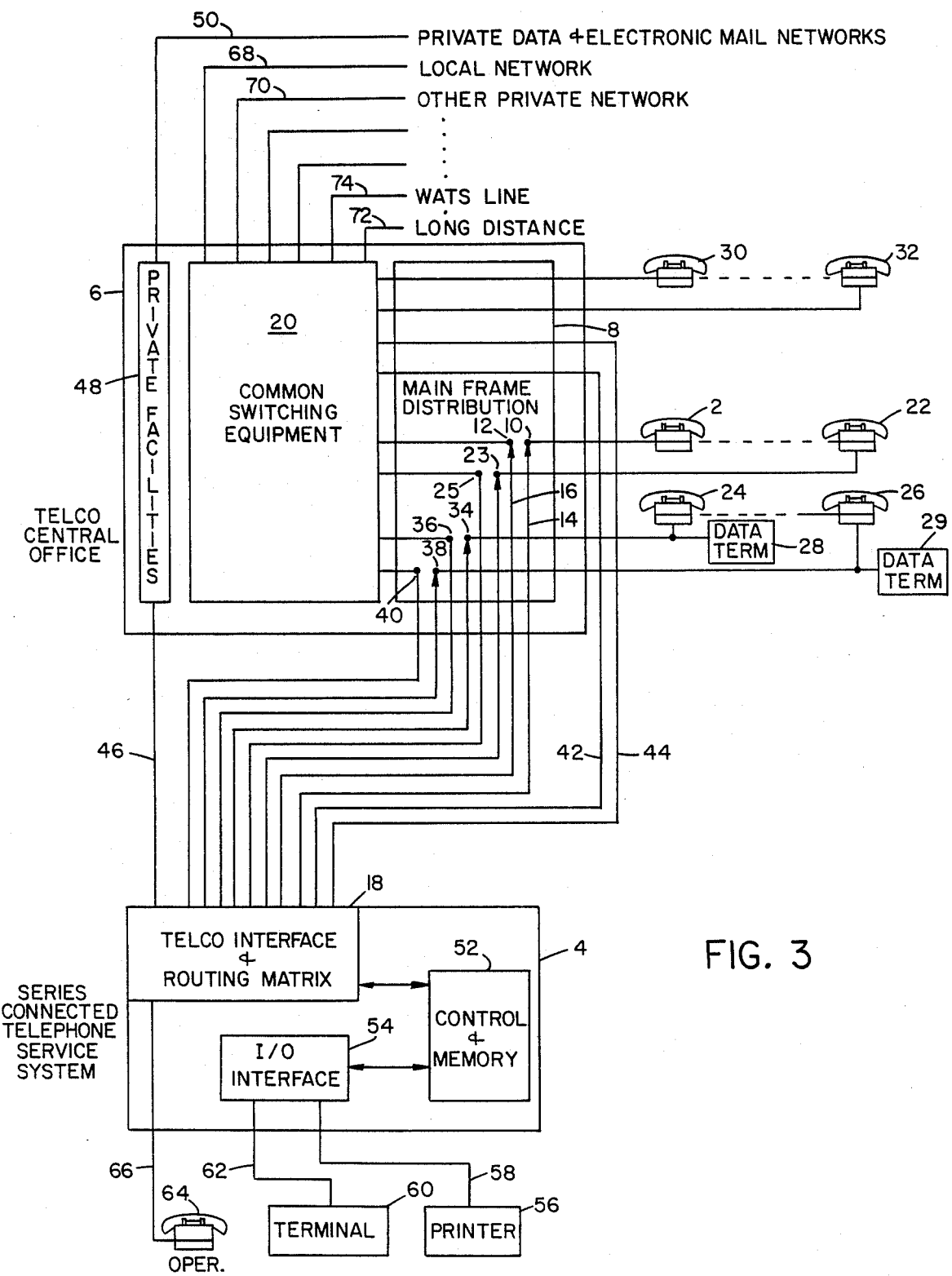
FIG. 3 is a more detailed block circuit diagram showing the arrangement of the series connected telephone service system of the present invention with more detail than that diagram of FIG. 2.

The series connected telephone service system 4 of the present invention is connected in series between a subscriber telephone 2 and the telephone company central office, TELCO, 6 such as shown in FIG. 1. This Figure provides a conceptual view of the interconnection between the various components. As used throughout the specification and claims herein as well as the illustration in the drawings, the terminology telephone line refers to a pair of wires forming such line.

As seen in FIG. 2, in one form of the invention the service system of the invention is remotely located from both the subscriber and the TELCO. Therein, telephone line 3 extends from subscriber telephone 2 to a first terminal 10 in main frame distribution mechanism 8. A line 14 then extends from terminal 10 to a TELCO interface and routing matrix 18 which forms part of telephone service system 4. Another wire then extends from TELCO interface 18 back to a second terminal 12 in main frame 8. A telephone line 14 then connects terminal 12 to the common switching equipment 20. In this manner, telephone service system 4 is connected in series between the subscriber telephone and common switching equipment 20 of TELCO 6.

As shown in FIG. 3, numerous subscribers can be interconnected to the telephone service system 4. In addition to subscriber telephone 2, there can be other subscribers such as subscriber telephone 22 as well as subscribers having their own data terminals such as subscriber telephones 24 and 26 with data terminals 28 and 29. Of course, there also will be other non-subscribing telephones coupled to TELCO such as represented by telephones 30 and 32 which have telephone lines that pass directly through main frame distribution mechanism 8.

Subscriber telephone 22 has its telephone line extending to main frame distribution mechanism 8 so as to be connected to a first terminal 23 which in turn is connected to TELCO interface and routing matrix 18 of telephone service system 4. A second terminal 25 associated with subscriber telephone 22 also is connected to TELCO interface and routing matrix 18 for completing the series connection. Subscriber telephone 24 has two associated terminals 34 and 36 that are connected to TELCO interface and routing matrix 18 and similarly subscriber 26 has two such terminals 38 and 40.

TELCO interface and routing matrix 18 act as the interface to the main frame distribution as well as having several of its own independent telephone lines, such as lines 42 and 44, directly connected through main frame distribution mechanism 8 to common switching equipment 20. In addition, TELCO interface and routing matrix 18 can have a private telephone line 46 which connects through private facilities 48 in TELCO to a private data and electronic mail network 50. TELCO interface and routing matrix 18 is capable of bridging the telephone line from any of the subscribers to system 4 to the associated telephone line extending back to the main frame distribution mechanism for enabling a subscriber to receive and/or place telephone calls. Alternatively, TELCO interface and routing matrix 18 can couple the subscriber telephone line to one of the system's independent lines such as lines 42, 44 and 46 such as when the subscriber is placing a call thereby leaving free the line extending from the common switching equipment and the main frame distribution mechanism associated with such subscriber for receipt of other incoming calls. One or more of the independent telephone lines of system 4 can be a special line for placing long distance telephone calls (e.g. a WATS line or a private network line, e.g. MCI).

Operation of telephone service system 4 is controlled by control and memory mechanism 52 which is coupled for both sending control signals to and receiving information from TELCO interface and routing matrix 18 as well as an input/output interface (I/O interface) 54. I/O interface 54 is connected to a printer 56 by way of a telephone line 58 and a telephone answering service (referred to as "TAS") terminal through a telephone line 62. In addition, TELCO interface and routing matrix 18 can be coupled to a TAS operator 64 through a telephone line 66.

When a subscriber picks up the phone and establishes an off-hook condition, an appropriate signal is transmitted automatically to telephone service system 4. The system then either couples the subscriber's telephone line to the associated telephone line extending back to the main frame distribution mechanism or upon receipt of selected control signals from the subscriber couples the subscriber to other lines for providing custom calling features or other services. Such signalling can be provided by the punching in of a particular code at the subscriber telephone within a limited initial time period and/or by the pressing of the * or # button on the telephone which generate appropriate control signals. These signals are then sensed by TELCO interface and routing matrix for supplying control signals to control memory mechanism 52 for causing the carrying out of the appropriate selected functions. The time period for such control signals to be generated would be relatively short after which period of time the subscriber telephone line, e.g. telephone line 14 is automatically coupled by a bridge mechanism to the associated telephone line 16 for providing normal calling services through TELCO. Upon coupling of subscriber telephone to a line to the TELCO common switching equipment, the subscriber receives a dial tone from TELCO. Such services can be provided either through local network 68 or other private networks 70 as well as long distance line 72 and WATS line 74.

Figure 18:
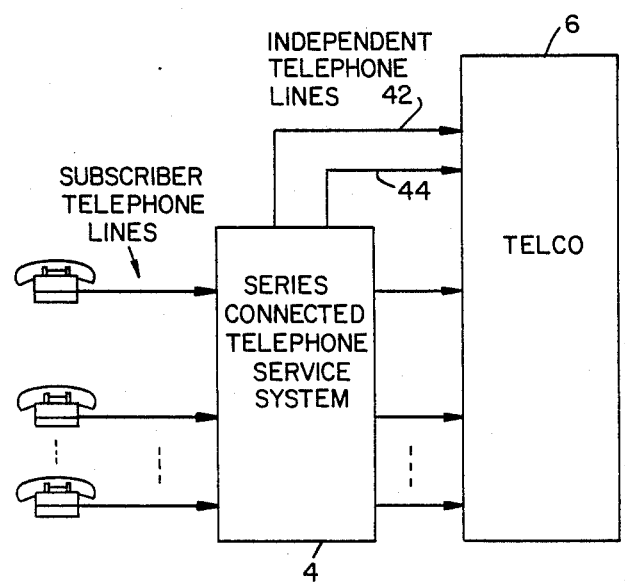
FIG. 18 shows interconnection of the series connected telephone service system of the present invention between the subscribers' telephone lines and the TELCO in greater detail than the diagram of FIG. 1.

More generally, however, the series connection of the inventive series connected service system between the subscribers' telephone lines and TELCO is shown in FIG. 18, which includes therein the independent lines 42 and 44 of the service system. It will be understood by those skilled in the art that a number of advantages accrue from locating the inventive system remotely from both the subscribers and TELCO as shown in FIG. 3.

Figure 4:
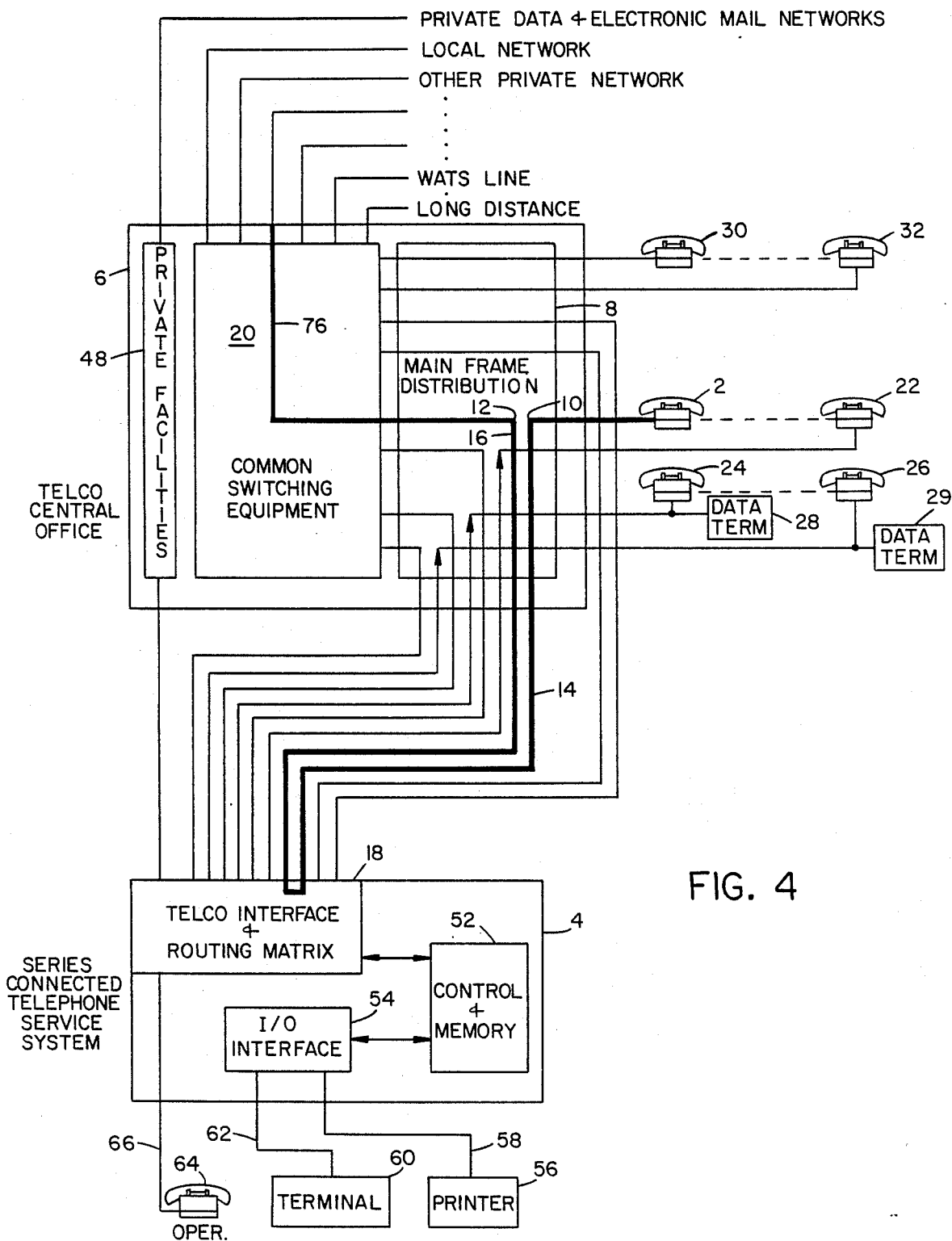
FIG. 4 is the same block diagram of FIG. 3 depicting ordinary telephone usage by a subscriber for incoming and outgoing telephone calls.

In FIG. 4, an ordinary telephone usage operation for incoming and outgoing calls is depicted for the arrangement of FIG. 3. As shown, an incoming call reaches TELCO common switching equipment 20 at point 76 which call is then switched to terminal 12 of main frame distribution mechanism 8. This call then is transmitted along telephone line 16 to TELCO interface and routing matrix 18 which bridges the call to telephone line 14. The call then is carried back to terminal 10 and sent along the telephone line to subscriber 2. The bridging mechanism in TELCO interface and routing matrix 18 can be a bridging relay which merely interconnects telephone lines 14 and 16.

Figure 5:
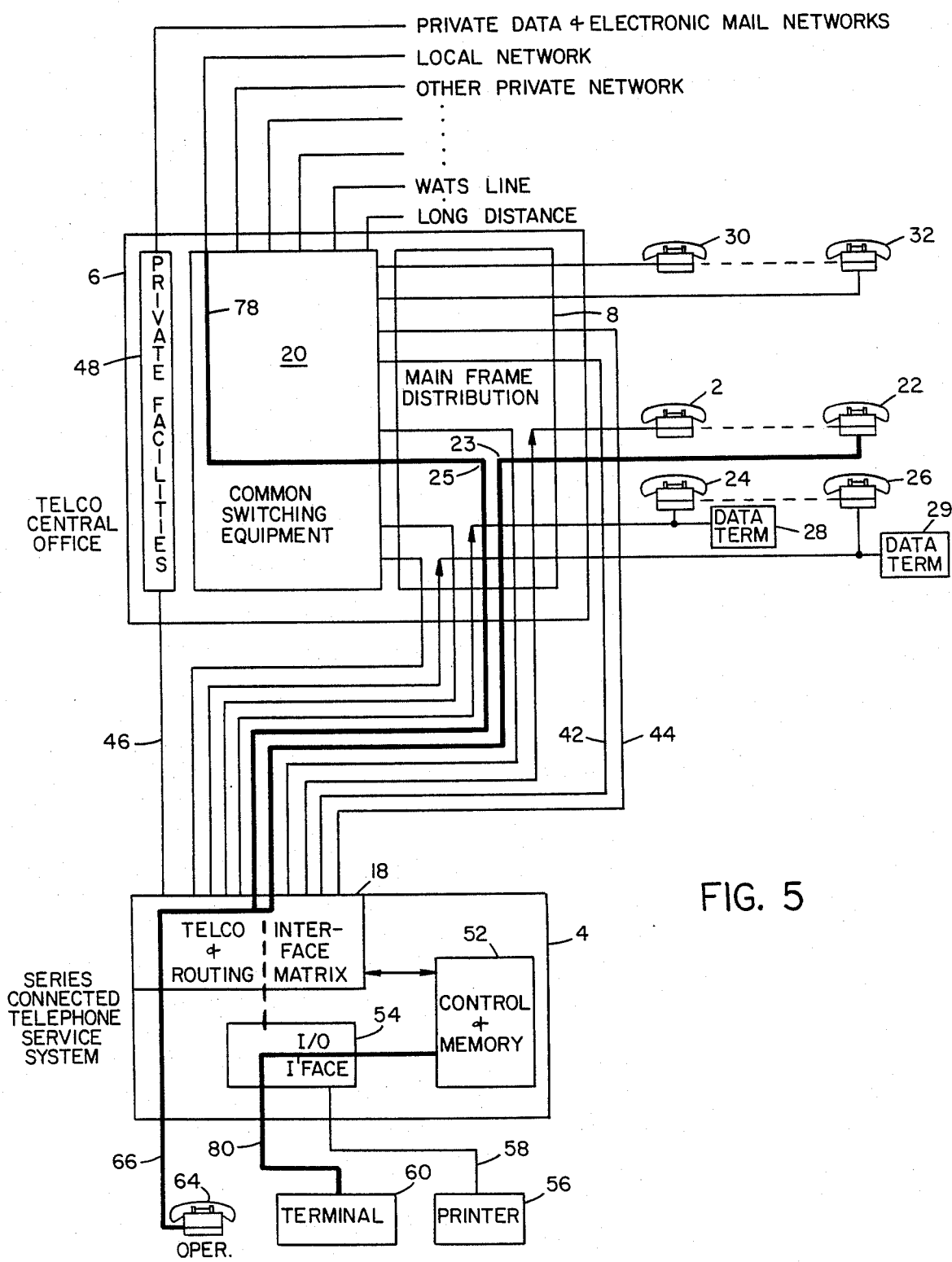
FIG. 5 is the same block circuit diagram of FIG. 3 depicting a telephone answering service operation.

A telephone usage where a telephone answering service bureau is provided is shown in FIG. 5. Such an operation would occur where a subscriber such as subscriber 22 has elected to employ the telephone answering service associated with telephone service system 4. In this situation where there is an incoming call along line 78 this call passes through TELCO common equipment 20 to main frame distribution mechanism 8 and arrives at terminal 25. The call then is transferred from terminal 25 along a telephone line to TELCO interface 18. At this location, the call can be intercepted by the telephone answering service via telephone line 66 so as to be answered by TAS operator telephone 64. For such purposes, different types of typical telephone answering services can be employed. One such possibility is that all incoming calls are answered by TAS operator 64. Alternatively, the incoming call can be coupled to the telephone line extending back to terminal 23 and main frame distribution mechanism 8 for connection to subscriber 22 and then only answered by TAS operator 64 after subscriber's telephone 22 has rung a certain selected number of rings. This operation would be controlled through control and memory mechanism 42. In addition, control and memory mechanism 52 can provide appropriate signals along a line 80 through I/O interface 54 to TAS terminal 60 for providing TAS-account identification. After the call has been answered by the TAS operator 64, either a message can be taken or if the call has not yet rung at subscriber location 22 the operator can ring the subscriber and announce the call to the subscriber after which the call is put through to the subscriber. Alternatively, the call also can be call forwarded by the TAS operator to another location through one of the independent telephone lines such as line 42. For these purposes, the incoming call would then be bridged through the TELCO interface and routing matrix 18 to line 42 for call forwarding the call to another telephone location.

Figure 6:
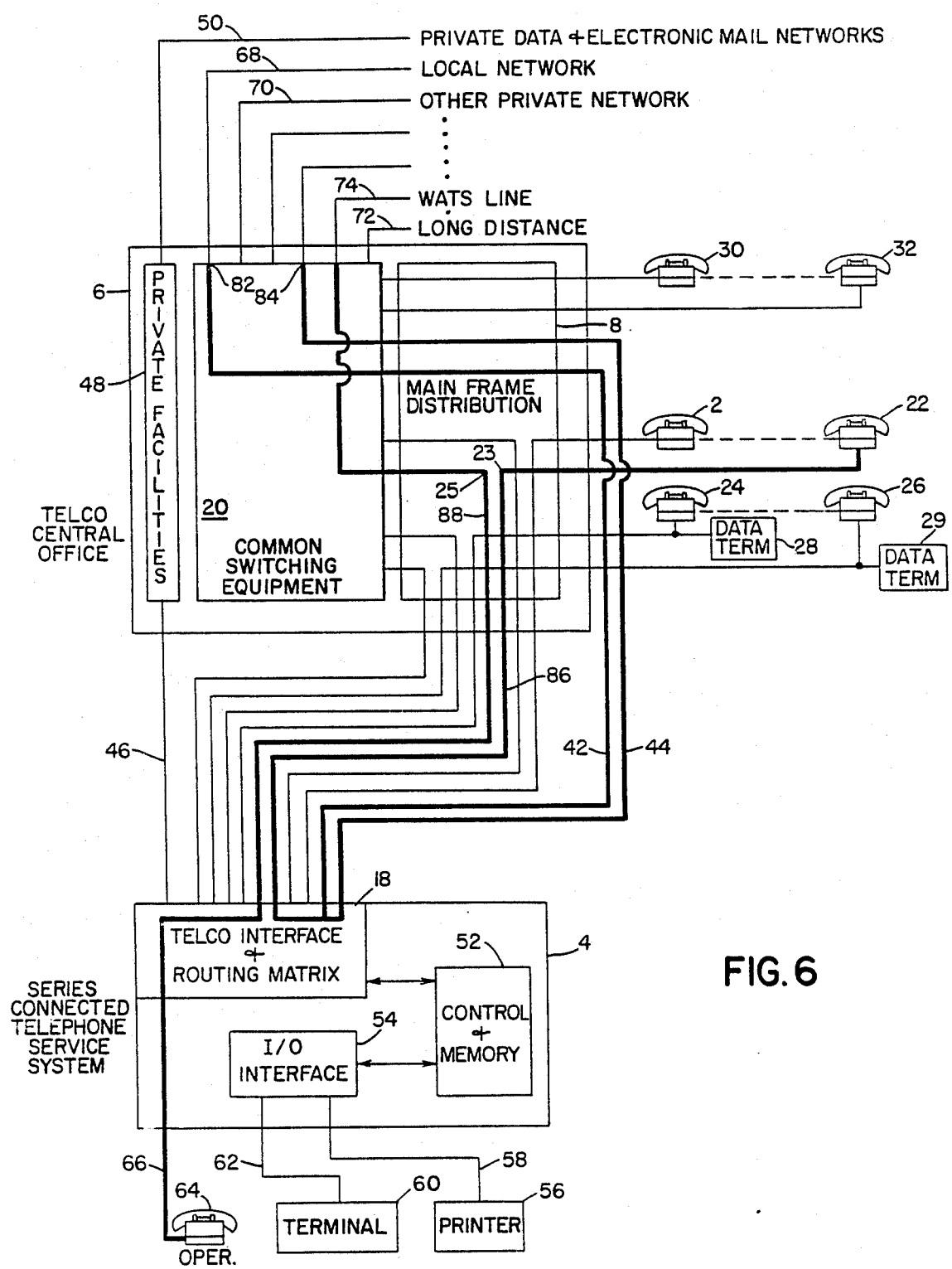
FIG. 6 is another block circuit diagram such as FIG. 3 depicting the operation when a conference call is originated by a subscriber.

Various conference calls can be originated by the subscriber to the telephone service system such as shown by the various communication paths in FIG. 6. When subscriber 22 wants to establish a conference call while simultaneously leaving open the subscriber's incoming telephone line, appropriate signalling for such purposes or merely the signalling of TAS operator 64 so as to provide such instructions are provided by the subscriber at telephone 22. As shown in FIG. 6, subscriber telephone 22 is coupled to a conference call with two other parties through independent telephone lines of the telephone service system while leaving open the subscriber's own line for incoming calls. For these purposes, the subscriber telephone line from subscriber telephone 22 is coupled from terminal 23 to TELCO interface and routing matrix 18. The subscriber line then is coupled to independent telephone lines 42 and 44 which then are connected through main frame distribution mechanism 8 and TELCO common equipment 20 to output lines 82 and 84. All of the lines, line 86 from terminal 23, along with lines 42 and 44 are coupled together through a bridging mechanism in TELCO interface and routing matrix 18. At the same time, line 88 coupled to terminal 25 associated with subscriber telephone 22 is left open thereby enabling the TAS operator 64 to answer any incoming calls on this subscriber's line.

Figure 7:
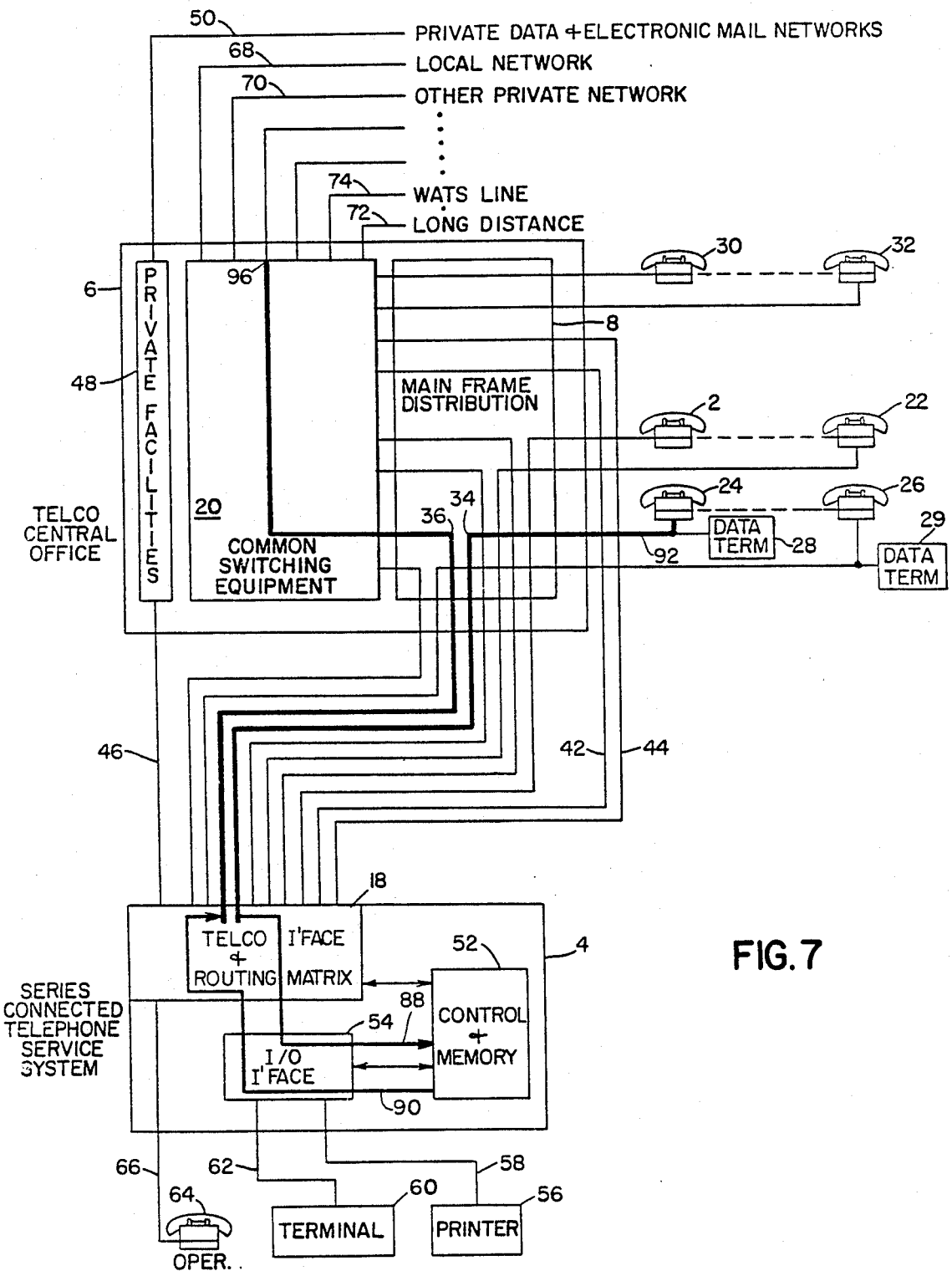
FIG. 7 is the same block diagram of FIG. 3 depicting an operation for selecting the best routing when a telephone call is placed by a subscriber.

Telephone service system 4 is capable of selecting the best route for placing a long distance telephone call. Such call can be placed either on the subscriber's own line such as depicted in FIG. 7 or one of the independent lines such as described above, such as, for example on WATS line 74. In the operation of the system shown in FIG. 7, when subscriber 24 dials a long distance telephone line, the telephone is coupled along line 92 to terminal 34 and then to TELCO interface and routing matrix 18. A signal is provided to control a memory matrix 52 for intercepting the dialed number through I/O interface 54. Control and memory mechanism 52 then determines the optimum transmission path, which is normally based on the lowest cost for such transmission, for the long distance telephone call. This information is then fed back along line 90 for selecting a line for placing the long distance call. In FIG. 7, the line selected is an independent private network line (e.g. an MCI line) which means that the call is fed from terminal 36 along line 94 to an output location 96. Alternatively, the call could be coupled through an independent telephone line 42 or 44 of the system to a special long distance line 72 or WATS line 74 rented for the system.

Figure 8:
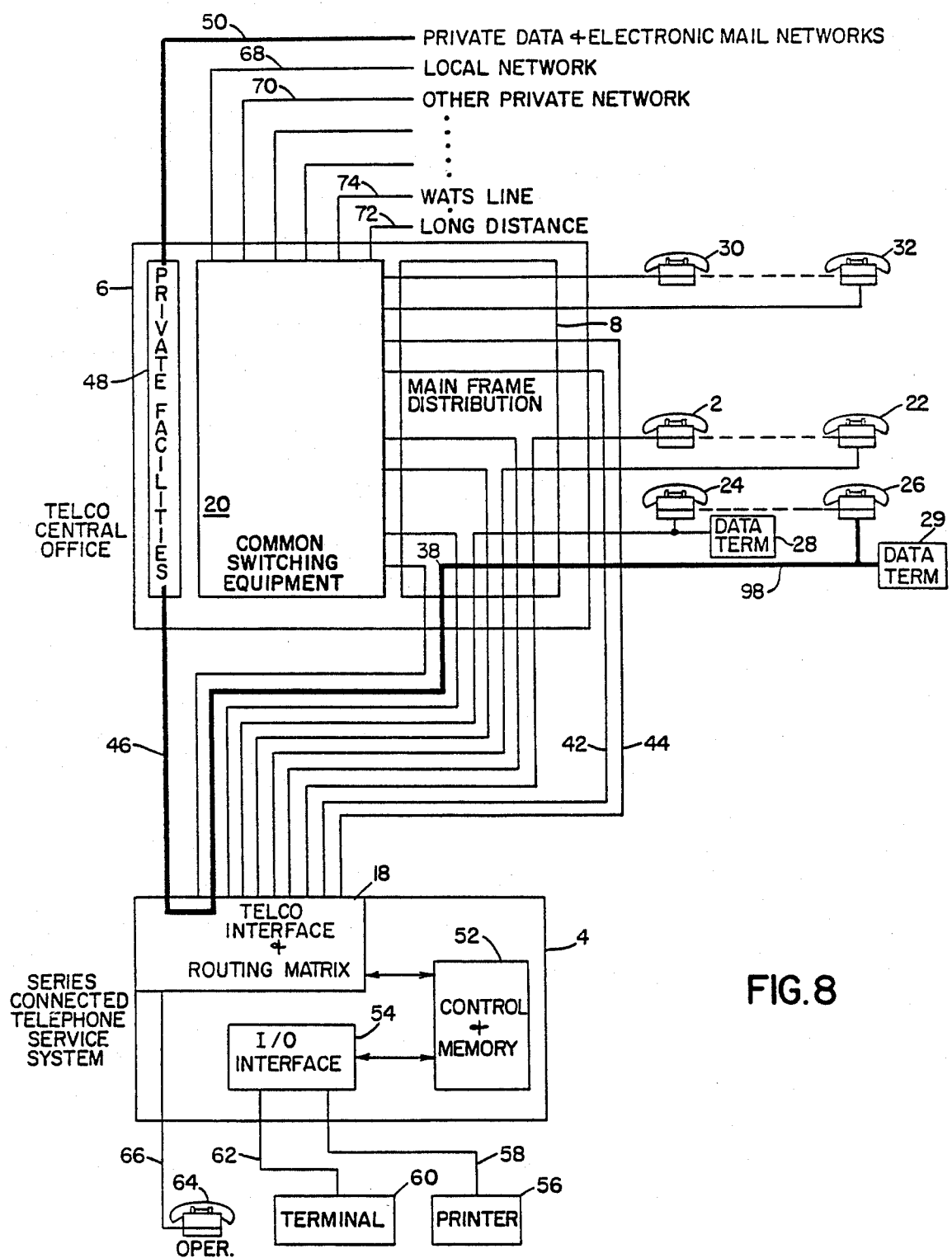
FIG. 8 is the block diagram of FIG. 3 depicting an electronic mail service operation.

As previously mentioned, telephone service system 4 can be used for the transmittal of electronic mail such as depicted in FIG. 8. When a subscriber 26 goes off-hook and sends an appropriate command signal to telephone service system 4 through line 98 and terminal 38, a request for a telephone line for transmitting such electronic mail is generated. The information is then transmitted by data terminal 29 along line 98 to TELCO interface and routing matrix 18 where the information is coupled to line 46. Line 46 carries the information through private facilities 48 to private data and electronic mail network 50 for transmission of such electronic mail.

Figure 9:
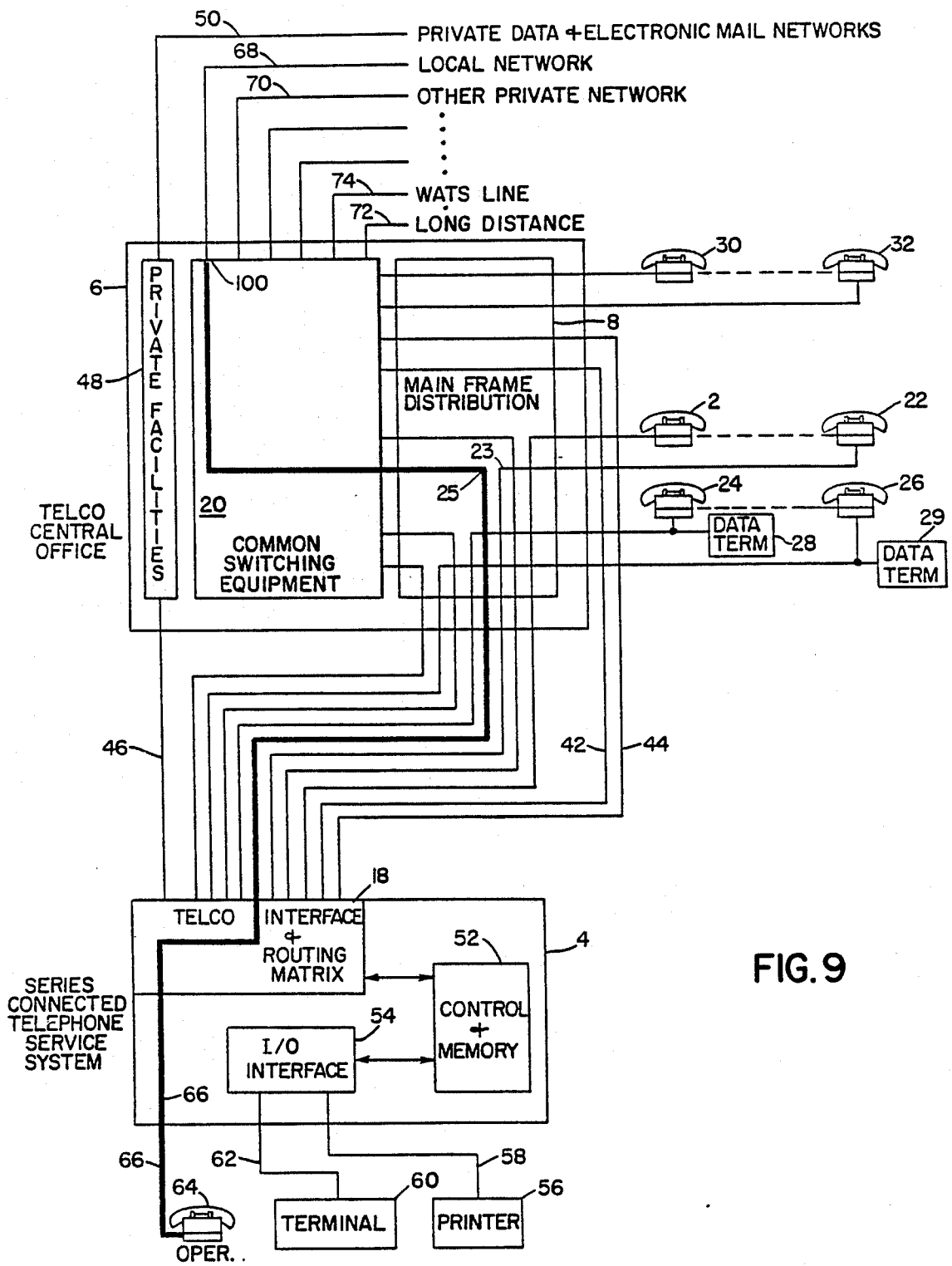
FIGS. 9, 10 and 11 are the same as the block diagram of FIG. 3 depicting a telephone intercept operation by the telephone answering service, where
Figure 10:
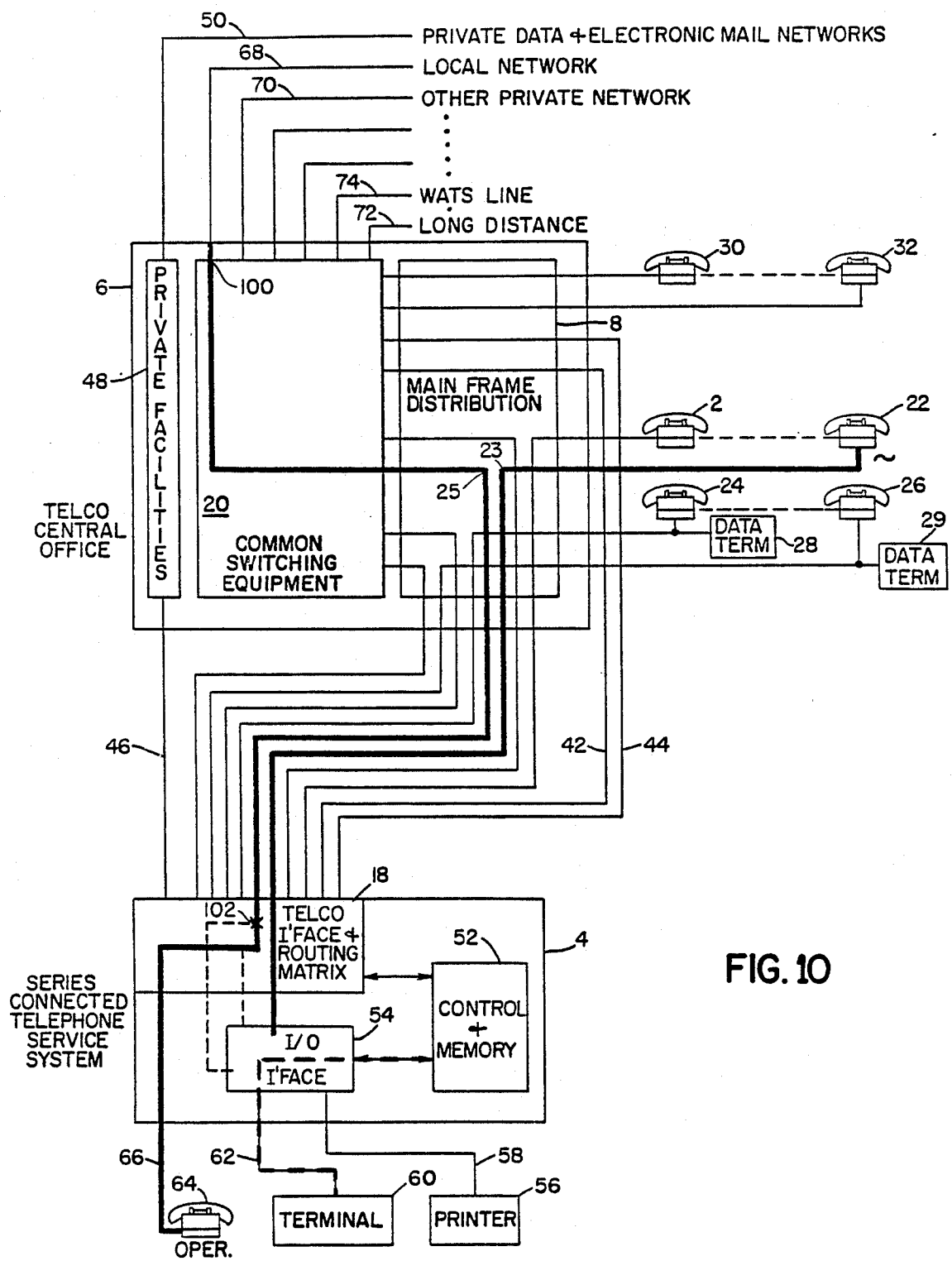
Figure 11:
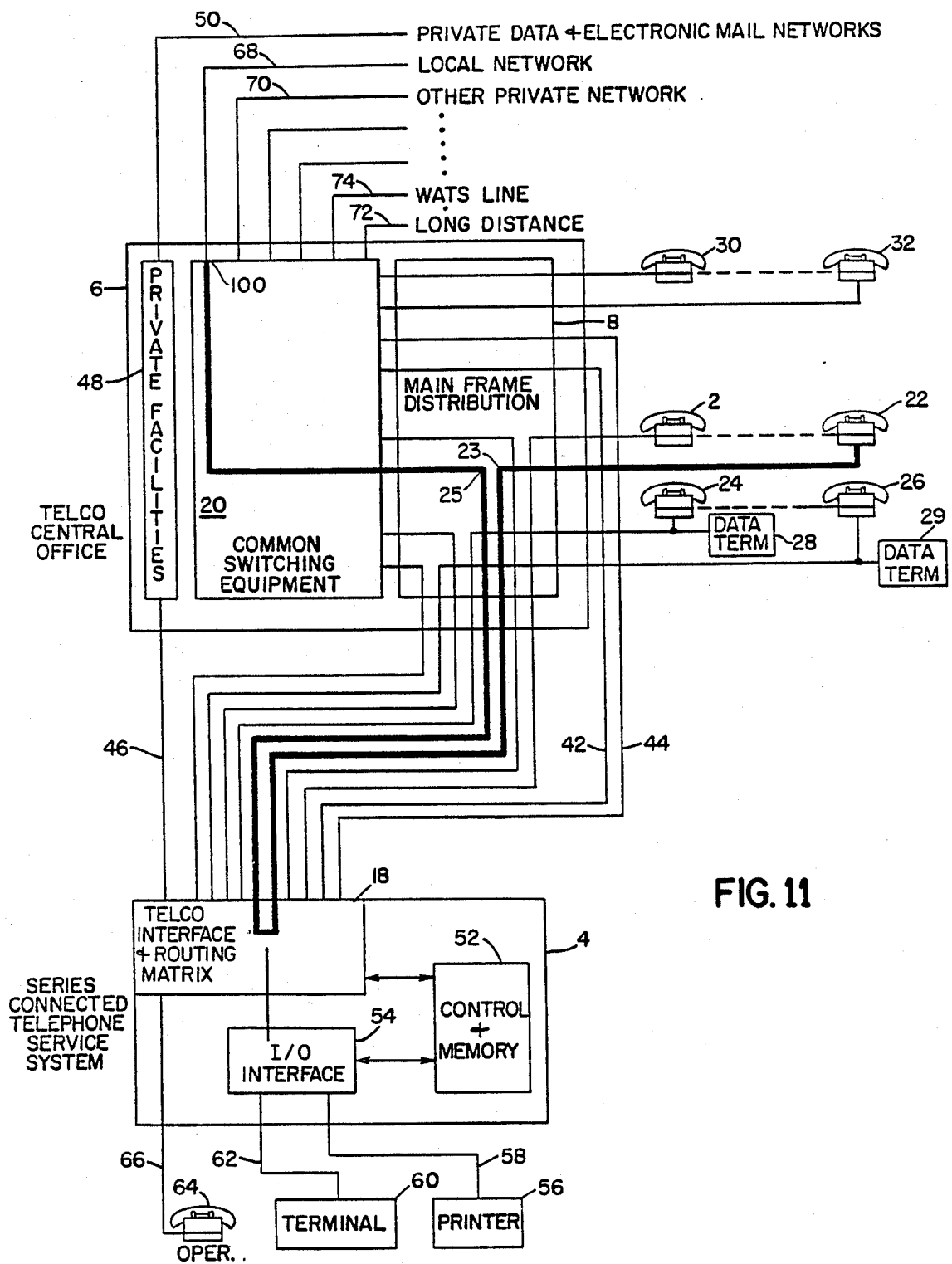

Telephone service system 4 can be used as a portion of a normal telephone answering service such as depicted in FIGS. 9, 10 and 11. When there is an incoming call at point 100, the call can pass through TELCO common switching equipment 20 to terminal 25 of main frame distribution mechanism 8 where it is then sent along the telephone line to TELCO interface and routing matrix 18. This call is answered by TAS operator 64 through telephone line 66.

As part of this process, control and memory mechanism 52 along with I/O interface 54 provides identification information on TAS terminal 60 along line 62 so that the operator knows which subscriber is receiving the call. Next, the TAS operator can contact subscriber 22 to inform such subscriber of the indentification of the incoming call. First, TAS operator 64 places the call on hold such as shown by the X at point 102 in FIG. 10 and then the TAS operator line 66 is coupled to the telephone line traveling to terminal 23 and from there along a telephone line to subscriber telephone 22. All of this is depicted in FIG. 10. Finally, TAS operator 64 can couple the caller and the subscriber through TELCO interface and routing matrix 18 such as shown in FIG. 11. TAS operator 64 then drops off the line although the line can still be supervised by a coupling between TELCO interface and routing matrix 18 and I/O interface 54.

Figure 12:
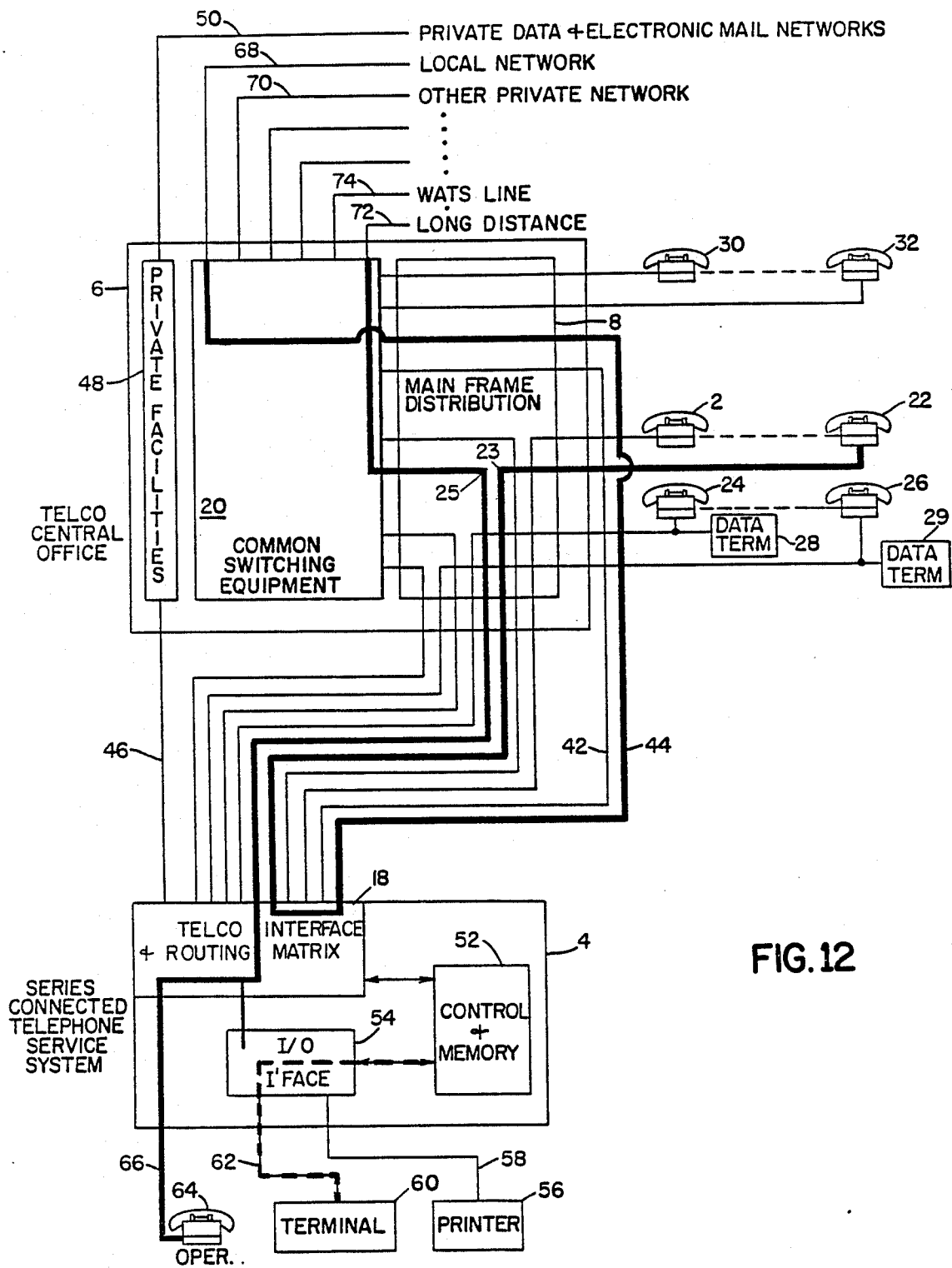
FIGS. 12, 13, 14 and 15 are the block diagram of FIG. 3 depicting an operation providing access to the subscriber to multiple incoming calls with the assistance of the telephone answering service operator.

FIGS. 12, 13, 14 and 15 depict the operation for enabling a subscriber to have access to several calls with the assistance of the TAS operator. An example would be where a client desires to make a long distance telephone call while simultaneously leaving open the subscriber's own line for an incoming call. Subscriber 22 expecting an important call goes off-hook and with the DTMF key depressed gains access to the telephone service system 4. Access is then provided by the telephone service system to bridge the telephone line from terminal 23 for subscriber telephone 22 to one of the system's normal outgoing business telephone lines 44 for placing the outgoing call along a local network 68. Now the telephone answering service monitors incoming calls along the subscriber's normal line that reach terminal 25. Such calls are fed through the TELCO interface and routing matrix along line 66 to TAS operator 64, all of which is shown in FIG. 12. Upon detection of a ringing signal at terminal 25, the TAS operator intercepts such call and with the assistance of information displayed on TAS terminal 60 is able to identify the subscriber being called.

Figure 13:
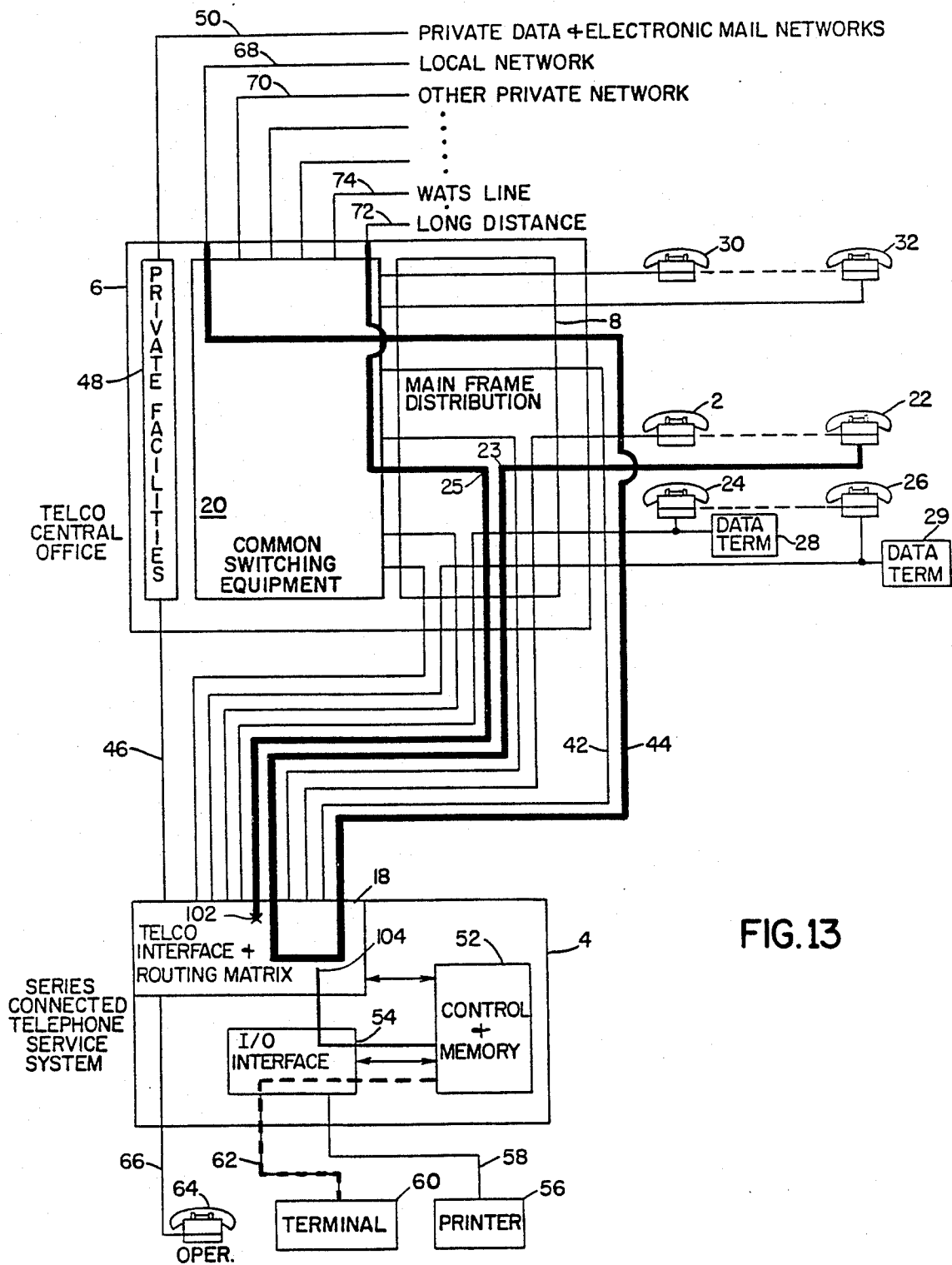

TAS operator 64 places the caller on hold as represented by the X at point 102. Next the TAS operator generates a call waiting signal which is superimposed along line 62 of I/O interface, control and memory mechanism 52 and TELCO interface and routing matrix 18 such as represented by the interconnection at point 104. This then alerts subscriber 22 that there is an important long distance telephone call waiting for such subscriber. All of these operations are depicted in FIG. 13.

Figure 14:
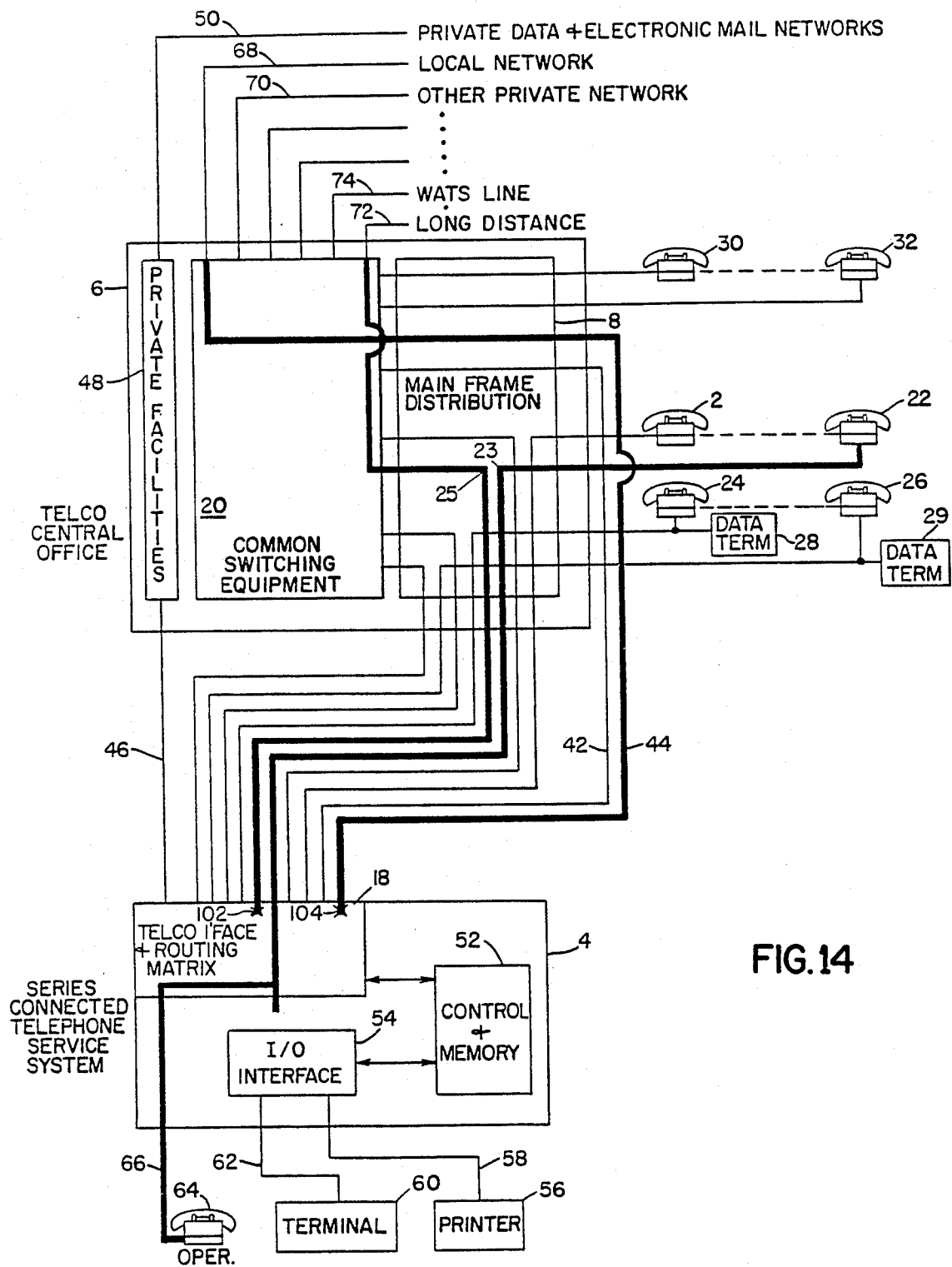

Next, as shown in FIG. 14 subscriber 22 can place the party with whom the subscriber is conversing on hold such as represented by the X at 104. Placing the party on hold is typically done by the subscriber flashing of the hook of subscriber telephone 22 in a well known manner. Subscriber 22 then is coupled to TAS operator 64 through line 66 to be informed as to the identity of the waiting call at point 102.

Figure 15:
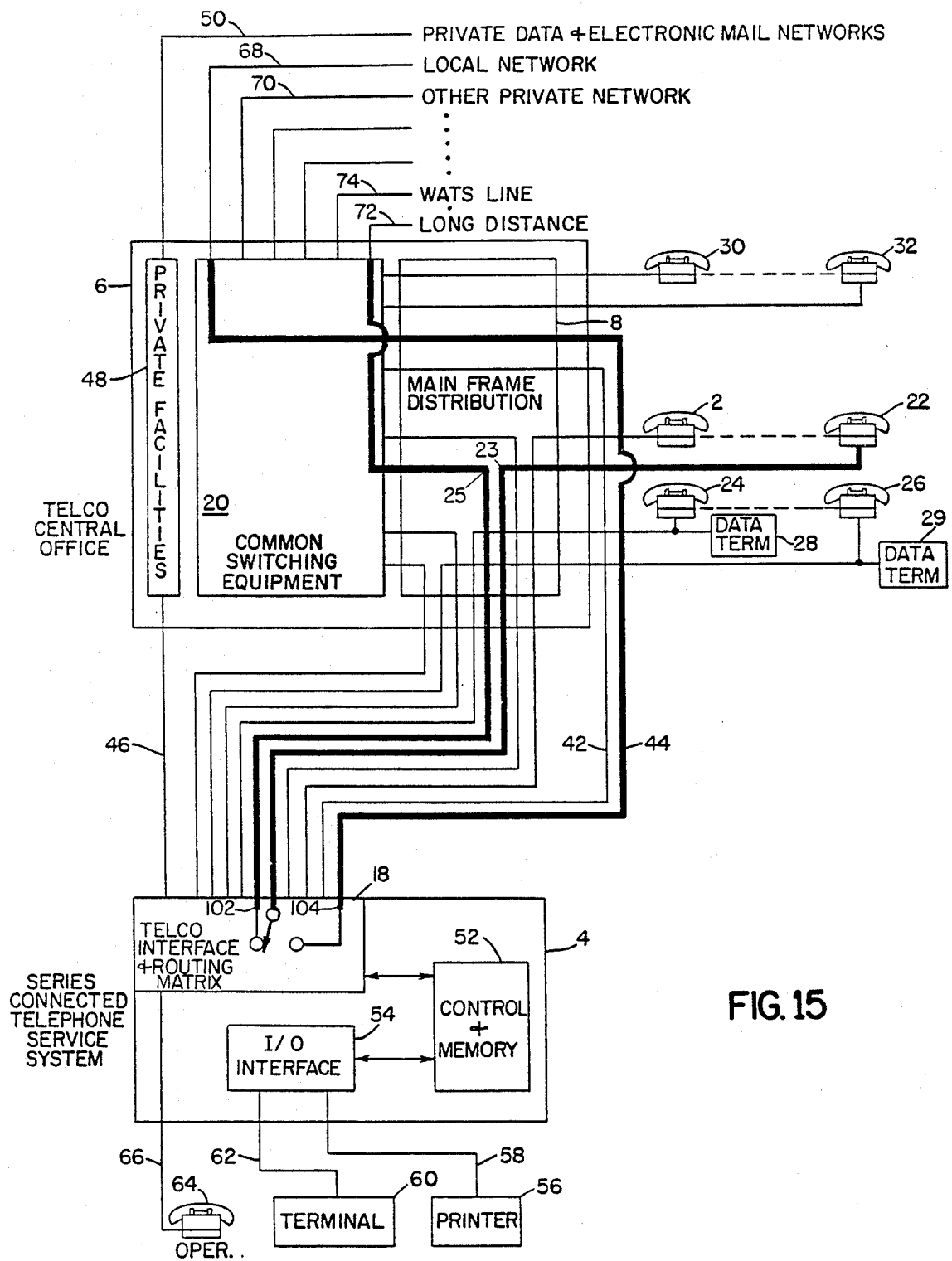

Subscriber 22 now can accept the incoming long distance call along telephone line 72 that arrives at TELCO interface and routing matrix 18 at point 102, as shown in FIG. 15. TAS operator 64 can provide appropriate control signals for forming such connection. At the same time TAS operator 64 can inform the party on line 44 at point 104 that subscriber 22 will call back later or the party on telephone line 44 can remain on hold until subscriber 22 completes the long distance call. As a further alternative, a conference call between the parties on lines 72 and 44 can be established with subscriber 22.

Figure 16:
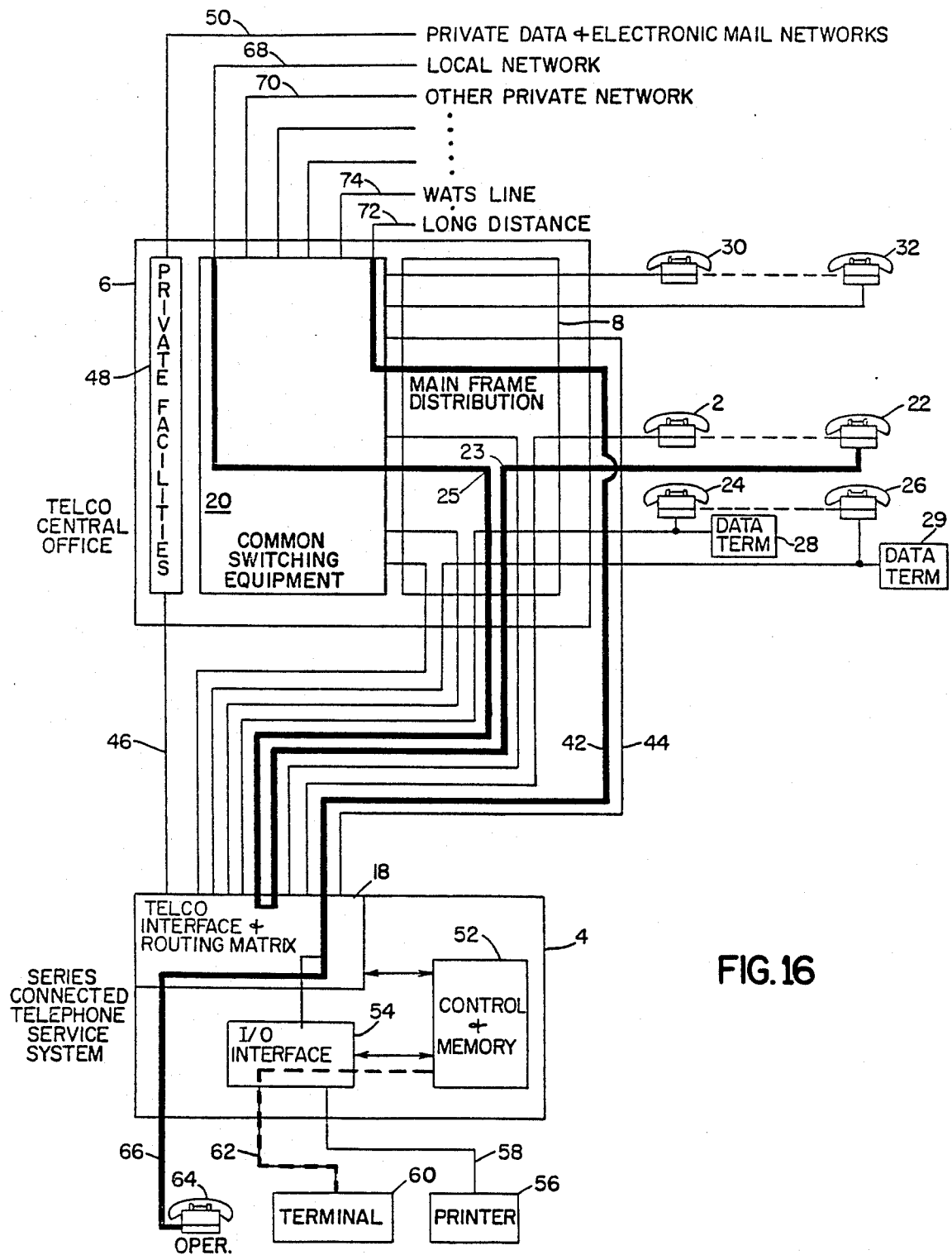
FIG. 16 is the block diagram of FIG. 3 depicting an operation interrupting a busy subscriber telephone line for a priority call.
Figure 17:
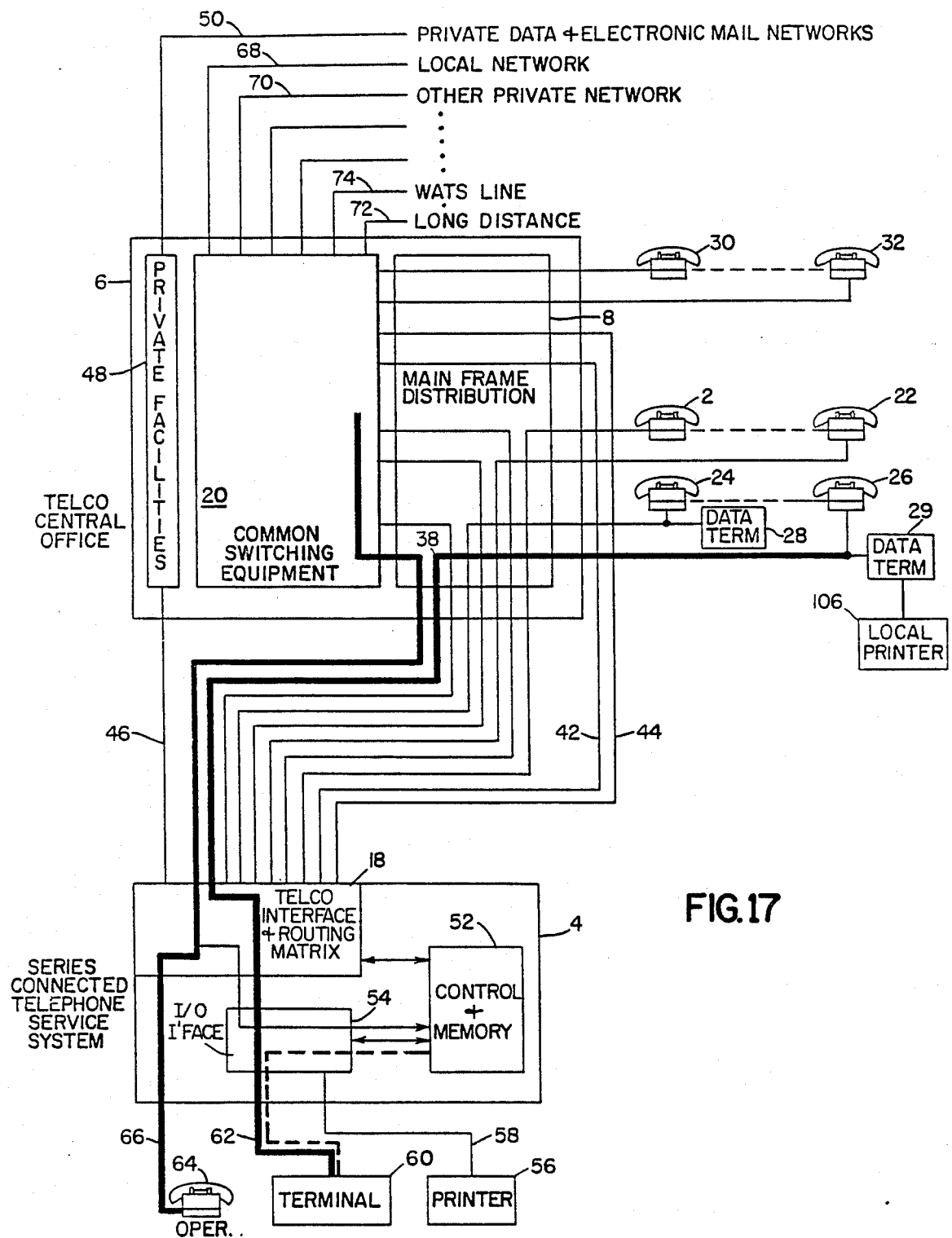
FIG. 17 is the block diagram of FIG. 3 depicting the transmission of a message to the subscriber from the telephone answering service.

Another technique can also be utilized for alerting subscriber 22 of important incoming calls, this technique being depicted in FIG. 16. Initially, subscriber 22 is coupled in an ongoing conversation through terminals 23 and 25 that are interconnected through TELCO interface and routing matrix 18 such as shown in the Figure. In this manner, subscriber 22 is coupled to a local network along telephone line 68. If there is an incoming call, for example, an incoming long distance call along telephone line 72, this call can be call forwarded to a telephone number associated with the telephone answering service of telephone service system 4 since the normal telephone line of subscriber 22 is already busy. Telephone answering service operator 64 then can obtain the identification information for the subscriber being called through TAS terminal 60. TAS operator 64 then answers the incoming call along line 66. If the call is of an emergency nature or a call for which the subscriber has been waiting, the TAS operator can impose a call waiting signal on the telephone line to the subscriber. The subscriber then by flashing the hook can be connected to TAS operator 64 and if desired can be coupled to the incoming call that was answered by TAS operator 64.

Where the TAS operator 64 has taken a message for a subscriber, such as where a subscriber has temporarily left the location of the subscriber phone, then TAS operator 64 can transmit a message to a printer 106 attached to a data terminal 29 of subscriber telephone 26 thereby providing this subscriber with the message as depicted in FIG. 17. Here as before the TAS operator answers the subscriber's telephone to take a message in the same manner utilizing TAS terminal 60 for identifying the subscriber being called. After the message is taken, where the subscriber has a data terminal and printer a message can be sent by terminal 60 through the telephone line coupled to terminal 38 for printing out the message on printer 106.

It will be understood that each of the above described services and system features is similarly applicable to the arrangement of FIG. 18.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A series connected telephone service system coupled to an associated telephone central office by a plurality of telephone lines extending externally from the central office to said system, said system comprising:

a control switching means located remote from the associated telephone central office and coupled in a series connection in between a subscriber telephone line and a central office telephone line for such subscriber, said control switching means including bridging means for coupling the subscriber telephone line to one of the plurality of telephone lines extending from outside of the central office for placement and receipt of calls;

control means being able upon command to cause coupling of the subscriber telephone to a central office telephone line for placement of a call and coupling of a central office telephone line to the subscriber telephone for receipt of a call and to enable said system to communicate in both directions between the central office and the subscriber telephone;

special service means for providing special services to the subscriber by acting as an intercept between the subscriber telephone and the central office, said special service means including operator controlled telephone answer means for enabling an operator outside of the telephone central office to answer intercepted calls directed to a subscriber telephone;

said bridging means further operable for connecting said operator controlled means to the subscriber telephone for announcing an incoming call while holding the incoming call; and a pair of telephone lines associated with each subscriber, a first of each said pair of telephone lines extending externally from the central office from a corresponding first terminal in a main distribution frame in the central office to said control switching means of said system and a second of each said pair of telephone lines extending from said control switching means to a corresponding one of the subscribers to said system, and such main distribution frame then coupling such telephone lines to the central office's switching mechanisms for coupling to eternal telephone lines, said system having several independent telephone lines coupled to the central office independently of the subscriber telephone lines, said independent lines assigned to said system independently of assignment of subscriber telephone lines to the subscriber, said control switching means operable for coupling a subscriber placing a call to one of said independent telephone lines thereby leaving free the associated subscriber telephone line from the central office and said control means including means for monitoring and enabling answering of incoming calls on such associated subscriber telephone line from the central office.

2. A system according to claim 1 wherein said control switching means includes interface means for detecting and routing telephone calls between a subscriber telephone and a central office.

3. A system according to claim 2 wherein said control switching means includes screening means for screening signals sent to and received from a subscriber telephone.

4. A system according to claim 1 wherein said special service means includes a data terminal for displaying information relating to a subscriber telephone being coupled through said system.

5. A system according to claim 1 wherein said control means includes means for providing a call waiting signal to a subscriber telephone when such subscriber telephone is already engaged in another call.

6. A system according to claim 1 wherein said special service means includes means for transmitting data to a subscriber data terminal.

7. A system according to claim 1 wherein said special service means includes means capable of intercepting all calls to a subscriber telephone and directing such calls to said telephone answer means.

8. A system according to claim 1 wherein said special service means includes means for causing the establishing of a conference call between a subscriber telephone and at least two telephone lines extending to the central office.

9. A series connected telephone service system, said system comprising:

telephone answering means located remote from an associated telephone central office and including:

means for intercepting calls to a subscriber telephone and directing such intercepted calls to said telephone answering means and an operator controlled means for answering calls directed to a subscriber telephone;

an independent telephone line extending between the telephone central office and said system and coupling said system to the central office;

a control switching means coupled in a series connection in between each of a plurality of subscriber telephone lines and corresponding central office telephone lines associated with such subscribers, said control switching means including bridging means for coupling a selected one of the plurality of subscriber telephone lines to a telephone line to the central office for placement and receipt of calls for enabling normal service, said bridging means further operable for connecting said operator controlled means to the subscriber telephone for announcing an incoming call while holding the incoming call, and special service means for providing special services to the subscriber by acting as an intercept between the subscriber telephone and the central office, and control means operable upon command for coupling a selected one of the plurality of subscriber telephones to said independent line to the central office for placement of outgoing calls thereon and for leaving free the central office line associated with said subscriber to receive other calls to enable said system to communicate in both directions between the central office and the subscriber telephone.

10. A system according to claim 9 wherein telephone lines associated with said system connect a first terminal in a main distribution frame in the central office that is coupled to a subscriber to said control switching means and then connect said control switching means back to a corresponding second terminal in such main distribution frame and then finally couple such second terminals for the subscribers to the central office's switching mechanisms for coupling to external telephone lines.

11. A system according to claim 9 wherein said control switching means includes interface means for detecting and routing telephone calls between a subscriber telephone and a central office.

12. A system according to claim 11 wherein said control switching means includes screening means for screening signals sent to and received from a subscriber telephone.

13. A system according to claim 12 wherein said special service means includes a data terminal for displaying information relating to any subscriber telephone being coupled through said system.

14. A system according to claim 9 further comprising a plurality of independent telephone lines coupling said system to the central office, said control means operable for connecting a subscriber placing a call to any one of said plurality of independent telephone lines.

15. A series connected telephone service system, said system located remote from an associated telephone central office comprising:

telephone answering means for providing receptionist and call announcing services to a plurality of subscribers having a plurality of separate incoming trunk lines, including:

means for intercepting calls to a subscriber telephone and directing such intercepted calls to said telephone answering means, an operator controlled means for answering intercepted calls directed to a subscriber telephone;

a control switching means coupled in a series connection in between each of a plurality of subscriber telephone lines and corresponding central office telephone lines associated with such subscribers;

said control switching means including bridging means for coupling a selected one of the plurality of subscriber telephone lines to a telephone line to the central office for placement and receipt of calls for enabling normal service, said bridging means further operable for connecting said operator controlled means to the subscriber telephone for announcing an incoming call while holding the incoming call;

special service means for providing special services to the subscriber by acting as an intercept between the subscriber telephone and the central office;

an independent telephone line extending between the telephone central office and said system and coupling said system to the central office; and control means operable upon command for coupling a selected one of the plurality of subscriber telephone lines to said independent line to the central office for placement of outgoing calls thereon and for leaving free the central office line associated with said subscriber to receive other calls to enable said system to communicate in both directions between the central office and the subscriber telephone.

16. A system according to claim 15 wherein said system comprises a plurality of independent telephone lines coupled to the central office independent of the subscriber telephone lines, said control switching means is operable to couple a subscriber placing a call to one of said independent telephone lines leaving free the associated subscriber telephone line from the central office and wherein said control means includes means for monitoring incoming calls of such associated subscriber telephone line and said telephone answering means is able to answer such incoming calls.

17. A system according to claim 16 wherein said control means includes means for providing a call waiting signal to a subscriber telephone when such subscriber telephone is already engaged in another call.

18. A system according to claim 15 wherein said special service means includes means for transmitting data to a subscriber data terminal.

19. A system according to claim 15 wherein said special service means includes means for causing the establishing of a conference call between a subscriber telephone and at least two other telephone lines.

* * * * *